Sept. 10, 1929.　　C. A. CARLSON　　1,727,860
INTERNAL COMBUSTION ENGINE
Filed May 14, 1925　　2 Sheets-Sheet 2
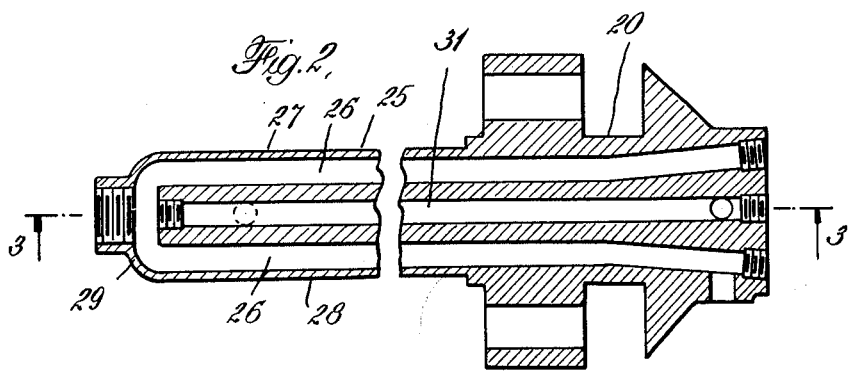
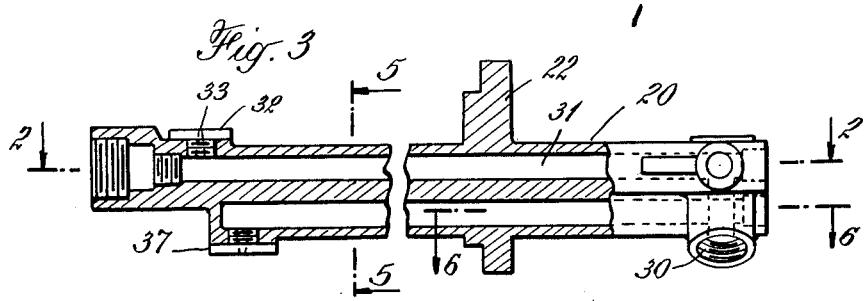
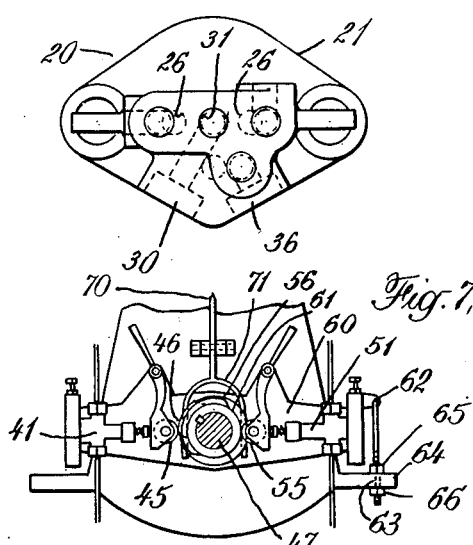
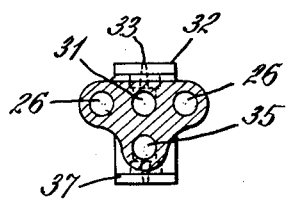
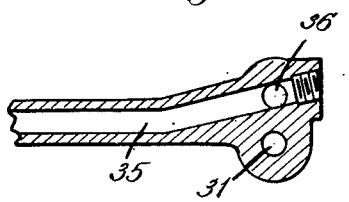
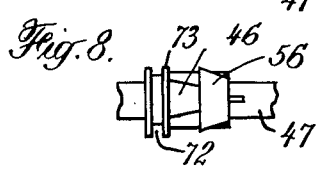
INVENTOR
Charles A. Carlson
BY
Marshall & Hawley
ATTORNEYS.

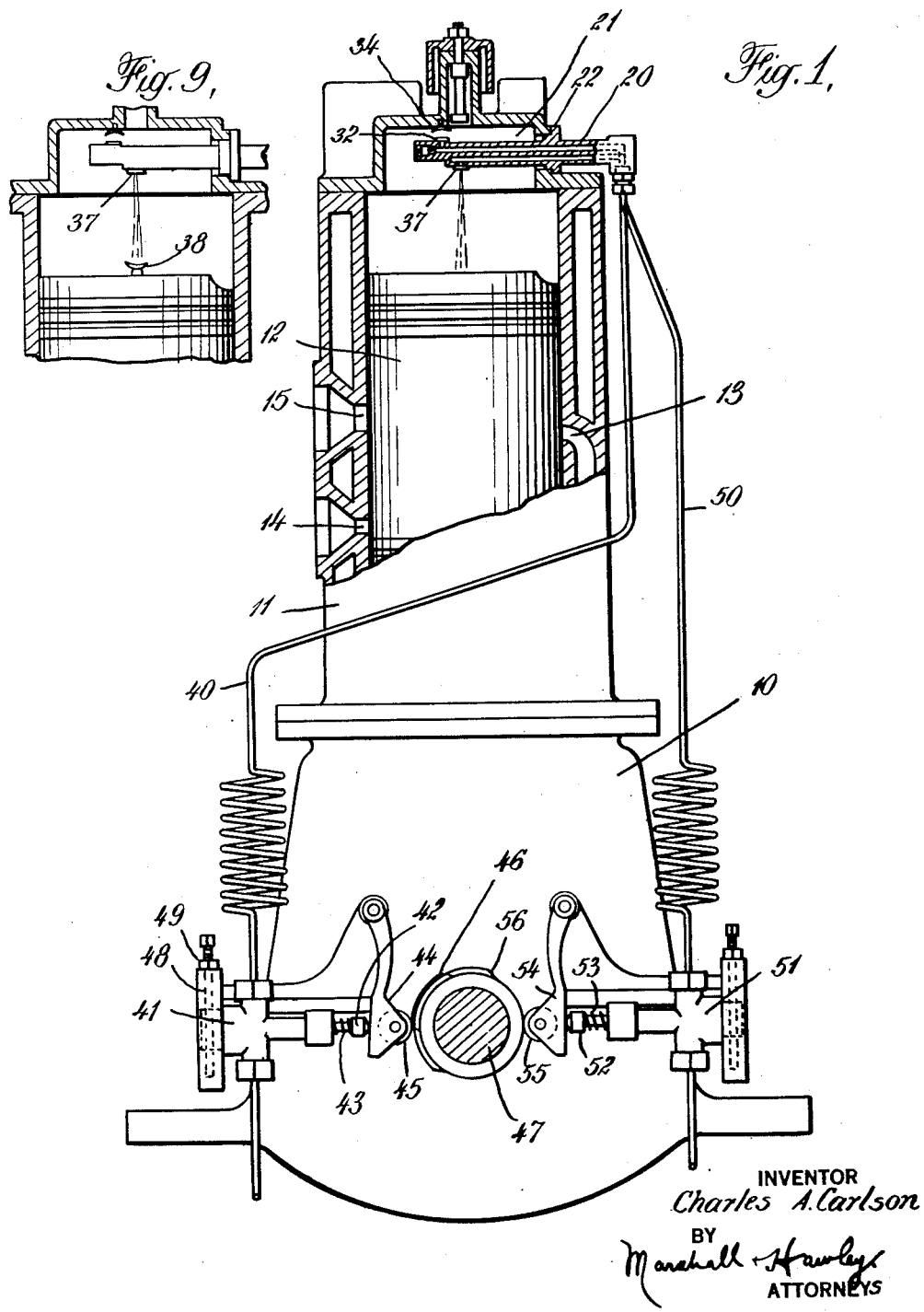

Patented Sept. 10, 1929.

1,727,860

UNITED STATES PATENT OFFICE.

CHARLES A. CARLSON, OF RIDLEY PARK, PENNSYLVANIA.

INTERNAL-COMBUSTION ENGINE.

Application filed May 14, 1925. Serial No. 30,143.

This invention relates to internal combustion engines and to methods of operating such engines.

The invention relates more particularly to engines of the type adapted for burning the heavier grades of fuel, although it is not limited to that type.

The invention has for its salient object to provide an engine of the type specified so constructed and arranged that it will operate quietly and efficiently.

Another object of the invention is to provide an engine so constructed that approximately complete combustion of the fuel will be effected, thereby avoiding carbon trouble.

Another object of the invention is to provide a combination internal combustion and steam engine so constructed and arranged that the expansive force of steam will be exerted on the piston in addition to the force due to the explosion of the fuel.

Another object of the invention is to provide means for cooling a piston of large diameter in an engine of the character specified.

Another object of the invention is to provide an effective cooling medium for internal combustion engines, so arranged that water jackets and the usual cooling systems are not necessary.

Another object of the invention is to provide an internal combustion engine in which the power is increased by using the heat units to create steam.

Another object of the invention is to provide a combination steam and internal combustion engine with means for changing the periods of admission of the fuel and steam.

Another object of the invention is to provide a novel and efficient method of operating a combination internal combustion and steam engine.

Further objects of the invention will appear from the following specification taken in connection with the drawings, which form a part of this application, and in which Fig. 1 is a longitudinal sectional elevation partly broken away of an engine constructed in accordance with the invention.

Fig. 2 is an enlarged horizontal sectional elevation taken substantially on line 2—2 of Fig. 3 showing the nozzle through which the fuel and water are injected into the cylinder.

Fig. 3 is a sectional elevation taken substantially on line 3—3 of Fig. 2.

Fig. 4 is an end elevation of the structure shown in Fig. 2.

Fig. 5 is a transverse sectional elevation taken substantially on line 5—5 of Fig. 3.

Fig. 6 is a sectional elevation partly broken away taken substantially on line 6—6 of Fig. 3.

Fig. 7 is a fragmentary view showing in elevation an adjustment for the fuel and water pumps.

Fig. 8 is a plan view of the cams for controlling the pump pistons, and

Fig. 9 is an elevation of a part of a piston head showing a hot plate or button carried thereby.

The invention briefly described consists in a method of operating an internal combustion engine and in carrying out the method, fuel is injected on the compression stroke and water is injected into the cylinder and against the piston head when the piston is moving through the power or expansion stroke.

The injection of water is preferably made when the piston has traveled substantially one-third of the length of its stroke and the injection is continued through a portion of the stroke. The water after it enters the cylinder and strikes against the hot piston head immediately changes into steam which expands and increases the force on the piston during its expansion stroke. Moreover, the contact of the water with the piston head assists in cooling the piston and this is very important in engines of this type since pistons of large diameter are often used and it is very difficult to effectively cool such pistons.

Furthermore, the addition of steam to the cylinder promotes more complete combustion of the fuel, thereby avoiding carbon trouble. The presence of the steam in the cylinder also has been found to effect a quiet operation of the engine and this is particularly true of the exhaust and the heat units are used for power instead of waste.

Means is also provided for varying the periods in the cycle when the fuel and water are admitted to the cylinder. Further details of the invention will appear from the following description.

The invention about to be described is adapted for use on internal combustion engines of various types and although it has been shown in connection with a two cycle engine, it should be understood that its use is not limited to engines of this type.

In the drawings there is illustrated an engine comprising a crank case 10 and a cylinder 11 mounted on the crank case and having mounted therein a piston 12. The cylinder is provided with inlet ports 13 and 14 through which compressed air is admitted to the cylinder. The cylinder also has an exhaust port 15.

The fuel and water are injected through a nozzle, the details of which are particularly illustrated in Figs. 2 to 6 inclusive. The nozzle 20 is mounted in the cylinder head 21 and is secured to the head by means of a flange 22. The nozzle comprises a casing 25 having a conduit 26 extending along the sides 27 and 28 and across the end 29 of the nozzle. This conduit is connected in any suitable manner with the water circulation system or water jacket of the engine and the cooling water circulates through the conduit 26 thereby cooling the nozzle.

The fuel enters the nozzle through a port 30 and passes into a conduit 31 having a plug 32 at the upper side thereof. The plug 32 is apertured as shown at 33 and the oil is forced out through this aperture against a dished hot plate 34. As the oil engages the hot plate, it is instantly vaporized.

The nozzle 20 is also provided with a conduit 35 which receives water from an inlet port 36. The conduit 35 has connected therewith an apertured plug 37, the plug being mounted at the bottom of the conduit adjacent the inner end thereof. It should also be noted that the plug 37 is disposed substantially in alinement with the axis of the cylinder and of the piston and, therefore, the water which is injected into the cylinder through the conduit 35 and plug 37 will impinge against the piston head at the central portion thereof. If desired a dished plate or button 38 may be mounted on the piston head in alinement with the plug 37. This water will be instantly vaporized upon contact with the piston head and the steam will expand, thereby adding power to the piston.

The water inlet port 36 of the nozzle 20 is connected by a pipe 40 to a water pump 41 mounted on the crank case. This pump 41 may be of any desired character and that illustrated is a piston pump which is actuated by a plunger 42 spring retracted by a spring 43. The plunger 42 is in turn actuated by a lever 44 having a roller 45 positioned to be engaged by a cam 46 mounted on the crank shaft 47.

The pump 41 is vertically adjustable by means of the screw 48 having a lock nut 49 thereon. By vertically adjusting the pump with reference to the lever 44, the extent of travel of the piston in the pump can be regulated.

The cam 46 is preferably so constructed that the water pump will be actuated to inject water into the cylinder when the piston has traveled downwardly substantially one-third of its expansion stroke and the water will be admitted throughout a portion of the expansion stroke as, for instance, through one-third of the stroke.

The oil inlet port 30 of the nozzle is connected by a pipe 50 to an oil pump 51 preferably of the piston type and operated by a plunger 52 which is retracted by a spring 53. The plunger 52 is in turn actuated by a lever 54 having a roller 55 adapted to be engaged by a cam 56. The cam 56 is illustrated as mounted on the crank shaft 47 and is preferably so constructed and arranged that the oil pump will be operated to inject oil in the cylinder at substantially the point of dead center or the point of maximum compression. The oil can be injected throughout any desired portion of the travel of the piston and it has been found that one-tenth of the expansion stroke is satisfactory. This period of oil admission may, however be varied as desired to secure the most efficient operation of the engine.

The oil pump 51 is adjustable relative to the lever 54 in the same manner as the water pump 41, and the details of this adjustment need not be explained in detail.

In Fig. 7 the pumps 41 and 51 are shown as carried by a frame or arm 60, pivoted to swing about a central bearing 61 concentric with the axis of the shaft 47.

Any suitable means may be used to swing the arm 60 such as a threaded rod 63 pivoted to a lug 62 and extending through a lug 64. Nuts 65 and 66 are mounted on the rod 63 on opposite sides of the lug 64 for adjusting the rod and locking the rod in adjusted positions.

It will be evident that the adjustment of the arm 60 and the pumps 41 and 51 in one direction will cause the fuel and water to be injected earlier in the cycle and the adjustment of these elements in the opposite direction will cause the injections to be made later in the cycle.

The cams 46 and 56 are longitudinally adjustable on the shaft 47 by a lever 70, bifurcated at one end 71 and engaging a groove 72 in a collar 73 secured to and movable with the cams. This construction is fully disclosed in Patent 903,774 to Remington and need not be further described in this application.

The engine above described operates as follows. Under running conditions, the fuel is admitted on the compression stroke and the fuel will be injected throughout the desired portion of the expansion stroke as, for instance, through one-tenth of the stroke. When the piston has traveled approximately through one-third of its expansion stroke, the water will be injected through the orifice in the plug 37 and will be directed against the piston head or hot plate or button at substantially the center thereof. This water will cool the piston and will instantly change into steam and the steam will expand, thereby adding force to the power stroke of the piston and allowing higher piston speeds. The time of injection of fuel and water can be varied by adjusting the arm 60 shown in Fig. 7 in the manner hereinbefore described.

Since the nozzle 20 is water jacketed, the fuel and the water which are conducted therethrough will be maintained sufficiently cool to prevent their vaporizing before their admission into the cylinder.

Although one specific embodiment of the invention has been particularly shown and described, it will be understood that the invention has been particularly shown and described, it will be understood that the invention is capable of modification and that changes in the construction and in the arrangement of the various cooperating parts may be made without departing from the spirit or scope of the invention, as expressed in the following claim.

What I claim is:

In an internal combustion engine, a cylinder, a piston, means for injecting fuel into the cylinder in a generally upward direction for impingement against the cylinder head, and means for injecting water generally downward for impingement against the piston.

In witness whereof, I have hereunto set my hand this 4th day of May, 1925.

CHAS. A. CARLSON.